(12) United States Patent
Soula et al.

(10) Patent No.: US 9,796,142 B2
(45) Date of Patent: Oct. 24, 2017

(54) METHOD FOR MANUFACTURING A PART MADE OF COMPOSITE MATERIAL FOR AN AIRCRAFT STRUCTURE BY PULTRUSION AND COCURING

(71) Applicant: Airbus Operations (S.A.S.), Toulouse (FR)

(72) Inventors: Denis Soula, Toulouse (FR); Jérome Colmagro, Toulouse (FR); Matthieu Plet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/706,660

(22) Filed: May 7, 2015

(65) Prior Publication Data
US 2015/0321429 A1 Nov. 12, 2015

(30) Foreign Application Priority Data

May 9, 2014 (FR) ...................... 14 54182

(51) Int. Cl.
*B29C 70/52* (2006.01)
*B29C 35/02* (2006.01)
(Continued)

(52) U.S. Cl.
CPC ............ *B29C 70/523* (2013.01); *B29C 70/52* (2013.01); *B29D 99/0003* (2013.01);
(Continued)

(58) Field of Classification Search
CPC . B29C 66/71; B29C 66/7212; B29C 35/0277; B29C 70/523; B29C 70/446;
(Continued)

(56) References Cited

U.S. PATENT DOCUMENTS 3,979,709 A * 9/1976 Healey, Jr. ........... H01H 85/165
337/186
2009/0220747 A1 9/2009 Karem
(Continued)

FOREIGN PATENT DOCUMENTS

EP 2 586 585 A1 5/2013
FR 2984794 A1 * 6/2013 ............. B29C 70/52
WO 2013/093369 A1 6/2013

OTHER PUBLICATIONS

French Search Report for Application No. 14 54182 dated Jan. 30, 2015.

*Primary Examiner* — Linda L Gray
(74) *Attorney, Agent, or Firm* — Jenkins, Wilson, Taylor & Hunt, P.A.

(57) ABSTRACT

The manufacture of structural elements for aircraft requires the use of complex and costly methods, particularly in the case of parts of elongate overall shape and variable thickness or cross section made of composite material. The disclosure herein proposes to overcome this problem by a method that allows the manufacture of a structural part from a preform made of composite material of simple shape obtained by pultrusion and of one or more reinforcing elements made of composite material and secured by cocuring with the preform to a region of this preform which region is to be reinforced.

11 Claims, 8 Drawing Sheets

(51) Int. Cl.
*B29D 99/00* (2010.01)
*B29C 70/44* (2006.01)
*B29C 70/46* (2006.01)
*B29C 70/54* (2006.01)
*B29C 70/68* (2006.01)
*B29C 70/86* (2006.01)
*B29C 65/00* (2006.01)
*F16C 7/02* (2006.01)
*B29L 31/06* (2006.01)

(52) U.S. Cl.
CPC ...... *B29D 99/0046* (2013.01); *B29C 35/0277* (2013.01); *B29C 66/5324* (2013.01); *B29C 66/5344* (2013.01); *B29C 66/71* (2013.01); *B29C 66/721* (2013.01); *B29C 66/7212* (2013.01); *B29C 66/72141* (2013.01); *B29C 66/73754* (2013.01); *B29C 66/73941* (2013.01); *B29C 70/446* (2013.01); *B29C 70/462* (2013.01); *B29C 70/545* (2013.01); *B29C 70/68* (2013.01); *B29C 70/865* (2013.01); *B29L 2031/06* (2013.01); *F16C 7/026* (2013.01); *Y02T 50/433* (2013.01)

(58) Field of Classification Search
CPC ..... B29C 70/462; B29C 70/52; B29C 70/545; B29C 70/68; B29C 70/865; B29C 66/73754; B29C 66/5344; B29C 66/721; B29C 66/73941; B29C 66/72141; B29C 66/5324; B29K 2063/00; B29K 2307/04; B29L 2031/3076; B29L 2031/06; F16C 7/026; B29D 99/0046; Y02T 50/433
USPC ...................................................... 156/242
See application file for complete search history.

(56) References Cited

U.S. PATENT DOCUMENTS

| | | | |
|---|---|---|---|
| 2010/0196637 A1* | 8/2010 | Lippert | B29C 70/345 428/36.1 |
| 2010/0305269 A1* | 12/2010 | Gleich | B29B 15/125 524/606 |
| 2013/0020019 A1* | 1/2013 | Nogues | B29C 70/52 156/244.13 |
| 2014/0316063 A1* | 10/2014 | Hochstetter | B29C 70/52 524/607 |

* cited by examiner

METHOD FOR MANUFACTURING A PART MADE OF COMPOSITE MATERIAL FOR AN AIRCRAFT STRUCTURE BY PULTRUSION AND COCURING

CROSS-REFERENCE TO RELATED APPLICATION

This application claims priority to FR 14 54182 filed May 9, 2014, the entire disclosure of which is incorporated by reference herein.

TECHNICAL FIELD

The present disclosure relates to a method for manufacturing a part made of composite material intended to be incorporated into the structure of an aircraft.

BACKGROUND

Figure 1:
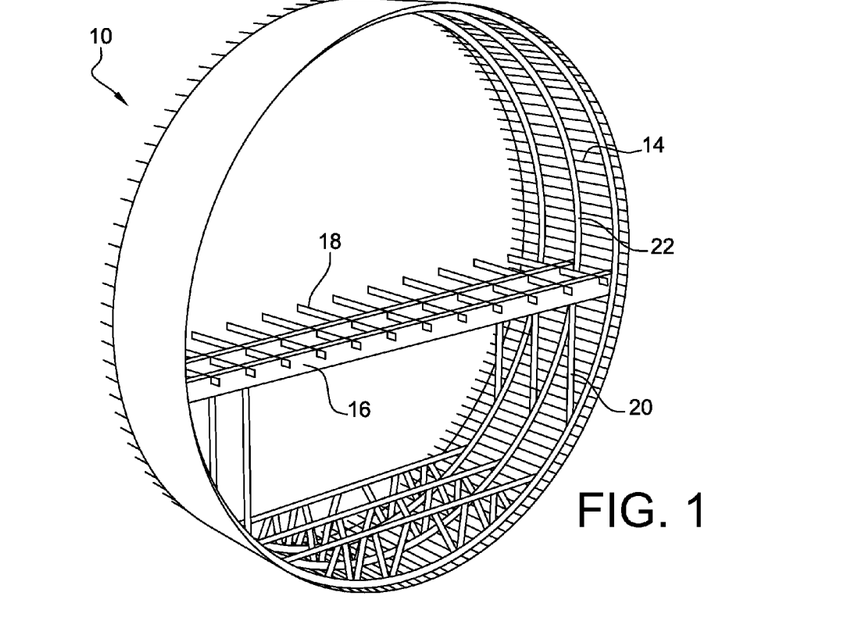
FIG. 1, already described, is a schematic perspective view of an aircraft fuselage section of known type.
Figure 2:
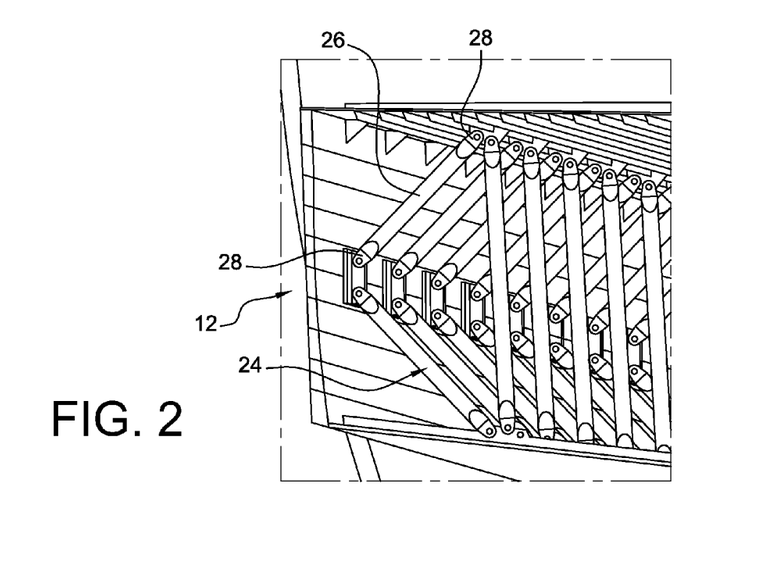
FIG. 2, already described, is a partial perspective schematic view of an aircraft central wing box of known type.

FIGS. 1 and 2 respectively illustrate a section of an aircraft fuselage 10 and part of an aircraft central wing box 12.

As FIG. 1 shows, the fuselage 10 comprises numerous structural parts of elongate overall shape. These parts consist for example of longitudinal stiffeners 14 of the fuselage, also referred to as "stringers", floor crossmembers 16, floor rails 18, and floor support struts 20 also referred to as "posts" connecting the floor crossmembers 16 to circumferential frames 22 of the fuselage. These various parts adopt the overall shape of girders the cross section of which is generally C-shaped, I-shaped, L-shaped, Z-shaped or omega-shaped.

As FIG. 2 shows, the central wing box 12 comprises structural link rods 24 each comprising a tubular central portion 26 and end parts 28 respectively forming attachment yokes.

These various parts were initially made of metal or of carbon.

However, as the use of composite materials is becoming more commonplace in order to reduce the mass of the structure of aircraft, it has become desirable to produce the parts described hereinabove from composite material, at low cost, and in a way that permits high production rates. What is meant by "composite material" is a material based on reinforcing fibers embedded in a matrix acting as a binder, such as a cured resin. The reinforcing fibers may be of metallic or organic nature. In the particular case of structural parts of elongate shape, such as the parts described hereinabove, use is preferably made of carbon fiber because of the very good mechanical properties thereof. The resin is usually a thermosetting resin, for example belonging to the epoxy resin family.

Figure 3:
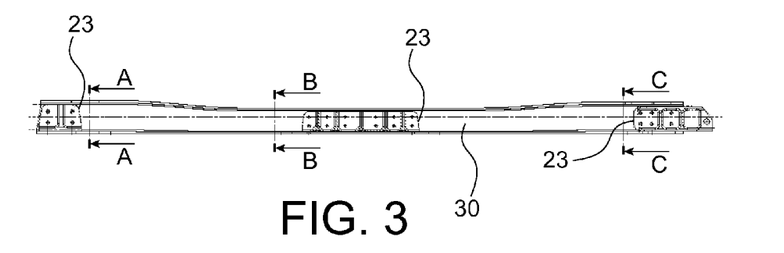
FIG. 3, already described, is a schematic side view of a stiffener for an aircraft of known type.
Figure 3A:
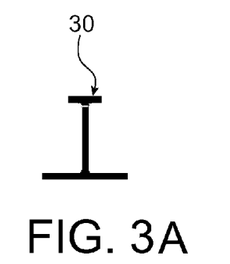
FIGS. 3A, 3B and 3C, already described, are schematic views in cross section of the stiffener of FIG. 3, on the planes A-A, B-B and C-C of FIG. 3 respectively.
Figure 3B:
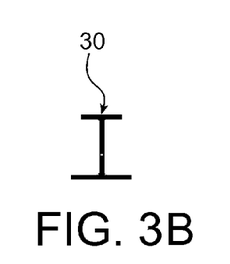
Figure 3C:
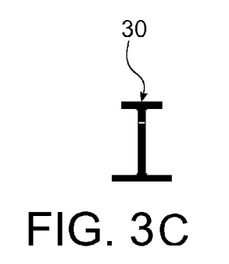

FIG. 3 thus illustrates a stiffener 30 of known type made of composite material, for example from pre-pregs or by infusion with resin. These techniques allow the creation of parts having a cross section that can vary along the part, as illustrated by FIGS. 3A, 3B and 3C which show the stiffener 30 in cross section on planes A-A, B-B and C-C of FIG. 3 respectively. In the case of the creation of parts of constant cross section, these parts can also be produced using pultrusion.

However, certain regions of these parts need to be reinforced. These are generally the regions involved in fixing the parts to other elements of the aircraft structures, such as the regions near the ends of the parts, and sometimes one or more regions in the middle of these parts.

For that reason, metal reinforcing elements 23 are attached to those regions of these parts that are to be reinforced. These reinforcing elements 23 are generally fixed in place by riveting or bolting, making the method of manufacturing these parts complex and costly.

Figure 4:
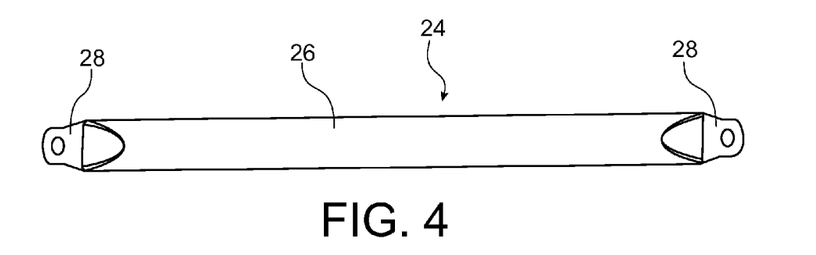
FIG. 4, already described, is a schematic side view of a structural link rod for an aircraft of known type.

Similarly, FIG. 4 illustrates a structural link rod 24 of known type, made as a single piece in composite material. Given the generally complex shape of the end parts 28 of such a link rod, the manufacture of such a link rod likewise requires a method that is complex and costly.

SUMMARY

It is an object of the disclosure herein to provide a simple, economical and effective solution to these problems.

To this end the disclosure herein proposes a method for manufacturing a part of elongate overall shape from composite material for an aircraft structure comprising:

creating a pultruded preform in a first composite material containing reinforcing fibers embedded in a polymerizable resin, so that the resin of the preform obtained is in a state of partial polymerization;

creating at least one reinforcing element from a second composite material containing reinforcing fibers embedded in a polymerizable resin so that the resin of the reinforcing element obtained is in a state of partial polymerization; then applying the at least one reinforcing element to a region of the preform which region is to be reinforced; then completing the polymerization of the resin belonging to the assembly formed of the preform and of the at least one reinforcing element; and thus obtaining a part in composite material for an aircraft structure that has at least one portion reinforced by the at least one reinforcing element.

The disclosure herein thus proposes to create structural parts from preforms made of composite material produced by pultrusion and reinforced by reinforcement elements made of composite material, these reinforcing elements being connected to the preforms by cocuring. What should be understood by that is that the polymerization of the resin of the preform and the polymerization of the resin of the at least one reinforcing element are completed jointly.

According to standard terminology, the term "preform" denotes a structure which overall has the definitive shape thereof, although the exact shape thereof may later be altered by potential machining operations. In all cases, the preform thus overall has the shape of the part obtained at the end of the process. In particular, the overall curvature of the preform cannot be changed after the step of creating this preform using pultrusion.

In addition, "created using pultrusion" and "creating a pultruded preform" means that the preform is obtained by pulling the reinforcing fibers through a die of a cross section that more or less complements the cross section of the preform, except as regards a possible thickening of this preform in the event of the use of the filament winding technique, as will become more clearly apparent in what follows.

In general, the disclosure herein therefore makes it possible to benefit from the simplicity and low cost of the pultrusion technique while at the same time guaranteeing an optimal quality bond between the reinforcing element and the rest of the part, by virtue of the cocuring technique. In addition, the quality of this bond may be checked using conventional non-destructive testing means, notably of the type using ultrasound.

The method according to the disclosure herein in particular makes it possible to reinforce specific regions of a part independently of the rest of the part.

Preferably, the part is a fuselage longitudinal stiffener or a floor crossmember or a floor rail or a floor support strut or a structural link rod.

Moreover, the preform advantageously has at least one end part intended for the fixing of the part and constituting the region that is to be reinforced to which the at least one reinforcing element is applied.

Furthermore, the method preferably comprises a later step comprising or consisting in piercing at least one orifice through the reinforced portion of the part.

In that case, the method preferably comprises a later step comprising or comprising or consisting in passing a cable or a duct or a fastener through the orifice.

As an alternative, the orifice may be left free and have the sole function of reducing the mass of the part.

In a first preferred embodiment of the disclosure herein, the at least one reinforcing element has a planar shape and is applied to a planar portion of the preform.

In a second preferred embodiment of the disclosure herein, the preform has a closed cross section, and the at least one reinforcing element is applied to the region of the preform which region is to be reinforced, by push-fitting.

Preferably, the preform is of tubular shape, and at least part of the at least one reinforcing element is of tubular shape able to be push-fitted together with the preform.

Preferably, the at least one reinforcing element consists of two reinforcing elements of tubular shape, and the reinforcing elements are respectively push-fitted into or on to two opposite end parts of the preform that preferably form fixing interfaces.

Preferably, the creation of the preform using pultrusion comprises a step of filament winding.

In general, the method advantageously comprises a later step comprising or consisting in machining the part, particularly in the region of the at least one reinforcing element.

Preferably, the degree of polymerization of the preform and of the reinforcing element prior to the step comprising or comprising or consisting in completing the polymerization of the assembly of these two elements is comprised between 10% and 50%, preferably between 20% and 30%.

Preferably, the at least one reinforcing element is also created using pultrusion.

BRIEF DESCRIPTION OF THE DRAWINGS

The disclosure herein will be better understood and further details, advantages and features thereof will become apparent from reading the following description given by way of nonlimiting example and with reference to the attached drawings in which:

FIGS. 13A to 17B are views similar respectively to FIGS. 8A to 12B and illustrate an alternative way of embodying the method according to the second embodiment of the disclosure herein.

Throughout these figures, identical references may denote elements that are identical or similar.

DETAILED DESCRIPTION

A method according to the disclosure herein is intended in general for the manufacture of a part in composite material for an aircraft structure. It relates in particular to the manufacture of parts of elongate overall shape, such as fuselage longitudinal stiffeners, floor cross members, floor rails, floor support struts or even structural link rods.

Figure 5:
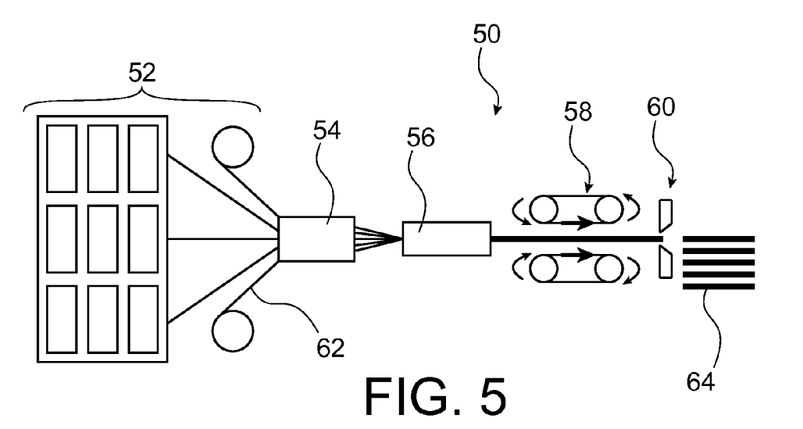
FIG. 5 is a schematic view of a pultrusion installation for implementing a method for manufacturing a part in composite material for an aircraft structure according to a first embodiment of the disclosure herein.

FIG. 5 very schematically illustrates a pultrusion installation 50 of a type known per se allowing implementation of a method according to a first embodiment of the disclosure herein.

This installation 50 comprises a support unit 52 for supporting reels of reinforcing fibers, such as carbon fiber, an impregnation unit 54, a curing unit 56, a traction unit 58 and a sawing unit 60.

A method according to the first embodiment of the disclosure herein first of all comprises the manufacture of a preform from a first composite material containing reinforcing fibers embedded in a polymerizable resin such as a resin of thermosetting epoxy type, using the pultrusion installation 50 and such that the resin of the preform obtained is in a state of partial polymerization.

To this end, the reinforcing fibers 62 are paid out gradually from the support unit 52 to enter the impregnation unit 54 where they are impregnated with the polymerizable resin, after which the fibers continue to progress through the curing unit 56 in which the fibers, impregnated with resin, are shaped by a die that defines the cross section of the preform, and in which partial polymerization of the resin is performed, preferably so as to result in a degree of polymerization of between 10% and 50% on leaving the curing unit 56, this degree preferably being comprised between 20% and 30%. Throughout the process, the traction on the reinforcing fibers that allows these to be paid out is provided by the traction unit 58. Finally, the sawing unit 60 allows preforms 64 of a desired length to be parted off as they leave the curing unit 56.

The preforms thus created have, for example, a C-shaped, I-shaped, L-shaped, Z-shaped or omega-shaped cross section.

Prior or subsequent to the creation of a preform 64 as explained hereinabove, or in parallel therewith, the method comprises the creation of one or more reinforcing elements or patches in a second composite material containing reinforcing fibers embedded in a polymerizable resin, such that the resin of each reinforcing element obtained is likewise in a state of partial polymerization, preferably likewise at a degree of polymerization of between 10% and 50%, this degree also preferably being comprised between 20% and 30%.

In the example illustrated, the reinforcing elements are made by the pultrusion installation 50 or a similar installation, and the second composite material is similar to the first composite material, which means to say that the fibers and the resin of the preform 64 and of the reinforcing elements are respectively of the same nature. The reinforcing elements for example take the form of plates or discs, as will become more clearly apparent in what follows.

The method next comprises applying each reinforcing element to a region of the preform 64 which region is to be reinforced.

To do so, a pressure of around 1 bar or more is applied to each reinforcing element to hold it on the preform 64, for example using vacuum bags or vacuum bladders, according to a technique known to those skilled in the art. The vacuum is preferably created upon contact of all the surfaces of the preform with each reinforcing element. Thus, the risk of delamination or the appearance of porosities can be limited as far as possible. In addition, the final geometry of the part thus formed is preferably provided by a metallic mould.

The assembly thus obtained is then placed in an autoclave or in an oven in order to complete the polymerization of the resin of the material of which the preform 64 and each reinforcing element is formed, preferably so as to attain a degree of polymerization of the resin greater than or equal to 95%.

As an alternative, the polymerization of the resin under pressure may be completed by a hot forming press, thus making it possible to avoid recourse to vacuum bags and the autoclave.

In general, the bond between the preform 64 and each reinforcing element is thus achieved by cocuring.

Figure 6:
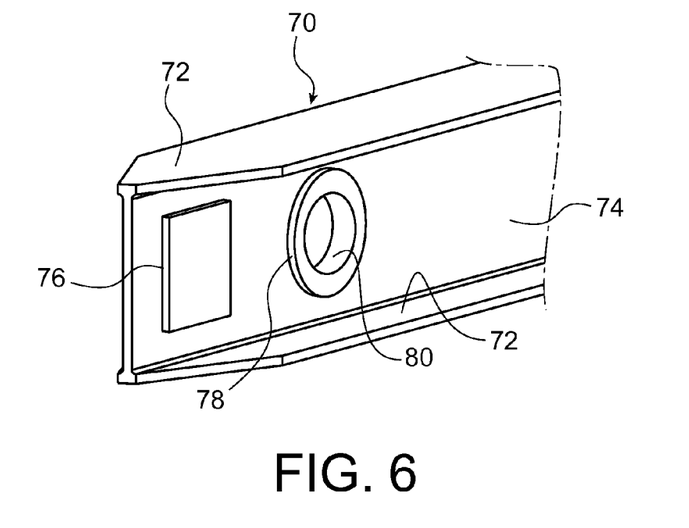
FIG. 6 is a partial perspective schematic view of a part in composite material for an aircraft structure which is produced by the method according to the first embodiment of the disclosure herein.

FIG. 6 illustrates an end part of a part obtained by the above method. In the example illustrated, the part is a floor support strut 70 of I-shaped cross section, namely comprising two soles 72 substantially parallel to one another and connected to one another by a web 74 substantially orthogonal to the soles 72.

The end part of the floor support strut 70 comprises two reinforcing elements 76 and 78 superposed on the web 74 of the strut 70 and bonded thereto by cocuring, at two regions of the web 74 that are to be reinforced. In this example, the reinforcing elements and the regions that are to be reinforced therefore have a planar shape.

By way of example, the reinforcing element 76 is in the form of a rectangular plate while the reinforcing element 78 is in the form of a disc and has also been holed, together with the web 74, to form an orifice 80 passing through the strut 70 to allow the passage of a pipe, a cable, a pipe or a duct, or alternatively for the passage of fasteners (not depicted in FIG. 6), or simply in order to reduce the mass of the strut 70. The mass of the reinforcing element 78 needed for reinforcing the edge of the orifice 80 may actually be considerably lower than the mass of the portion of web 74 removed in the formation of the orifice 80.

The reinforcing element 76 can be used as depicted in FIG. 6 in order to increase the thickness of the web 74 in a region thereof that needs to be reinforced.

As an alternative, the reinforcing element 76 can be pierced with one or more orifices later, for example for passing one or more fasteners (not depicted in FIG. 6). The reinforcing element 76 therefore makes it possible to improve the strength of the web 74, notably with regard to peening forces.

Figure 7:
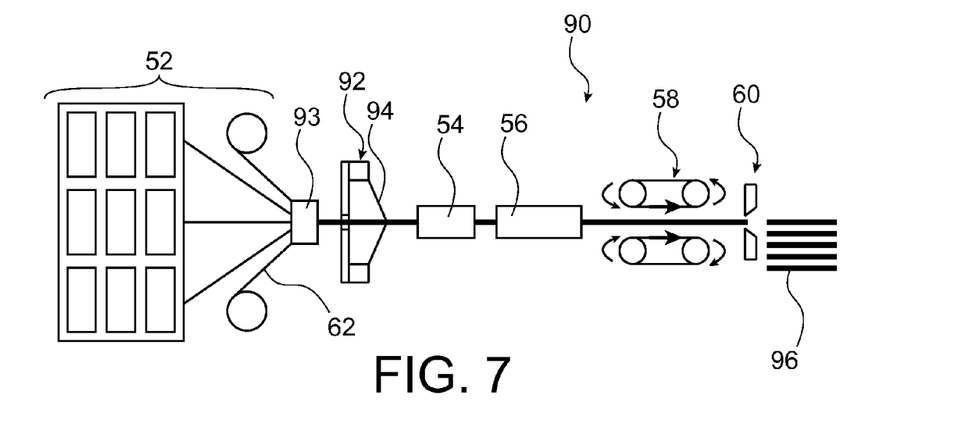
FIG. 7 is a schematic view of a pultrusion installation for implementing a method for manufacturing a part in composite material for an aircraft structure according to a second embodiment of the disclosure herein.

FIG. 7 very schematically illustrates a pultrusion installation 90 of a type known per se for implementing a method according to the second embodiment of the disclosure herein. This installation 90 is similar overall to the pultrusion installation 50 of FIG. 3 but differs therefrom at least in that it further comprises a filament winding unit 92.

In the example illustrated, the filament winding unit 92 is positioned between a pre-die 93 the impregnation unit 54.

The installation 90 thus allows the use of a technique of pultrusion with filament winding, commonly referred to as "pull winding", in which technique the support unit 52 supplies longitudinal reinforcing fibers 62 the passage of which through the pre-die 93 allows the creation of a preform of closed cross section, for example of circular cross section, while the filament winding unit 92 allows circumferential reinforcing fibers 94 to be wound around the preform formed by the longitudinal fibers 62 and thus allows the thickness of the preform to be increased.

The method according to the second embodiment of the disclosure herein, implemented using the pultrusion installation 90, is particularly advantageous in obtaining parts of tubular overall shape.

By way of example, FIGS. 8A to 12B illustrate the creation of a structural link rod 95 using this method.

The method comprises first of all the manufacture of a preform 96 (FIGS. 8A and 8B) in a first composite material comprising reinforcing fibers embedded in a polymerizable resin, using the pultrusion installation 90, and such that the resin of the preform obtained is in a state of partial polymerization.

To do that, the longitudinal reinforcing fibers 62 are paid out gradually from the support unit 52 and form a tubular assembly by passing through the pre-die 93, and the circumferential reinforcing fibers 94 are paid out progressively from the filament winding unit 92 and wound around the abovementioned tubular assembly, then the assembly enters the impregnation unit 54 in which the reinforcing fibers 62 and 94 are impregnated with the polymerizable resin, then the resin-impregnated reinforcing fibers continue their progress through the curing unit 56 in which a die shapes the assembly and in which a partial polymerization of the resin takes place, preferably so as to lead to a degree of polymerization of the resin of between 10% and 50% on leaving the curing unit 56, this degree preferably being comprised between 20% and 30%. Throughout the process, the traction on the reinforcing fibers 62 and 94 that allows these to be paid out is provided by the traction unit 58. Finally, the sawing unit 60 allows main profiles 96 of desired length to be parted off as they leave the curing unit 56.

Figure 8A:
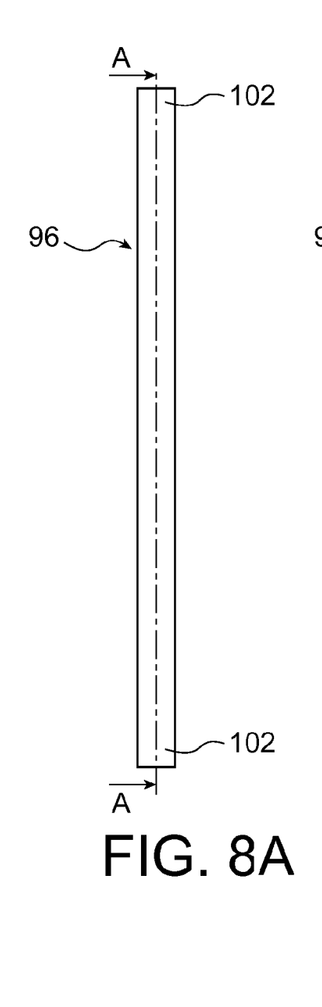
FIG. 8A is a schematic side view of a preform made of composite material produced by pultrusion in the implementation of the method according to the second embodiment of the disclosure herein.
Figure 8B:
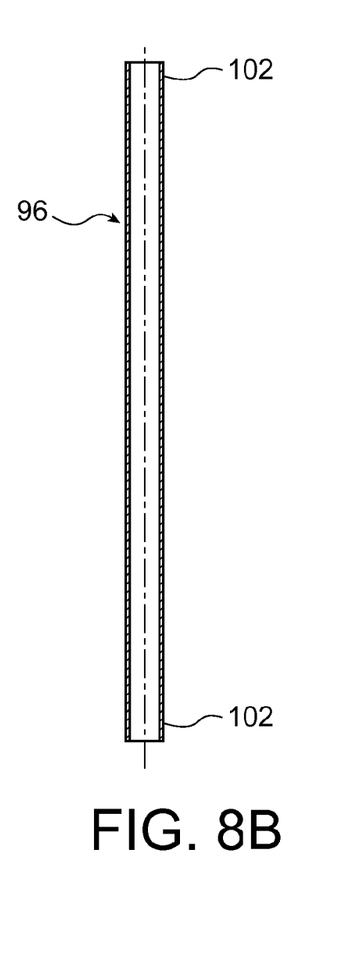
FIG. 8B is a schematic view in axial section on A-A of FIG. 8A of the preform of FIG. 8A.
Figure 9A:
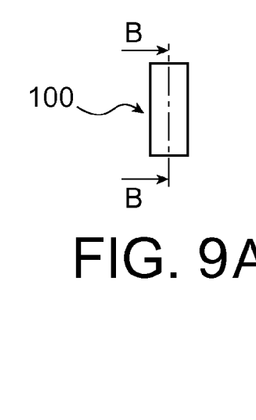
FIG. 9A is a schematic side view of a secondary profile made of composite material intended to form a reinforcing element and created by pultrusion in the implementation of the method according to the second embodiment of the disclosure herein.
Figure 9B:
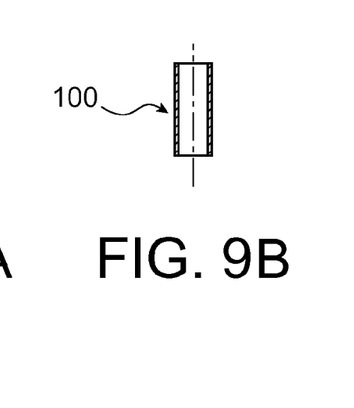
FIG. 9B is a schematic view in axial section on B-B of FIG. 9A of the secondary profile of FIG. 9A.

The preforms 96 thus produced have a tubular shape, for example with a circular cross section, as illustrated by FIGS. 8A and 8B.

Prior or subsequent to the creation of a preform 96 as explained hereinabove, or in parallel therewith, the method comprises the creation of one or more reinforcing elements 98 (FIGS. 10A and 10B) in a second composite material comprising reinforcing fibers embedded in a polymerizable resin, so that the resin of each reinforcing element obtained is likewise in a state of partial polymerization, preferably at a degree of polymerization of between 10% and 50%, this degree preferably being comprised between 20% and 30%.

In the example illustrated, the reinforcing elements 98 are manufactured from secondary performs 100 (FIGS. 9A and 9B) produced by the pultrusion installation 90 or a similar installation, and the second composite material is similar to the first composite material, which means to say that the fibers and the resin of the preform 96 and of the reinforcing elements 98 are respectively of the same nature. In addition, in this example, the reinforcing elements 98 are two in number and are similar to one another, only one of the reinforcing elements being depicted in the figures.

More specifically, the secondary performs 100 (FIGS. 9A and 9B) intended to form the reinforcing elements 98 are preferably manufactured in the same way as the preform 96. The secondary performs 100 nonetheless have a length shorter than the length of the preform 96 and an external section of a shape that substantially complements the internal section of the preform 96 so as to allow the secondary preforms 100 to be push-fitted together later into two opposite end parts 102 of the preform 96.

Figure 10A:
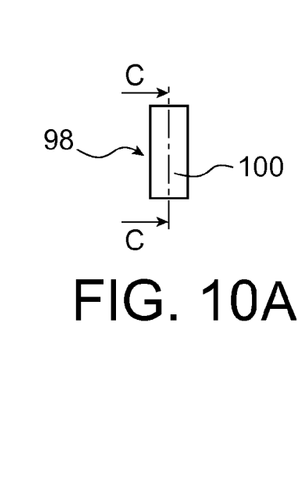
FIG. 10A is a schematic side view of a reinforcing element obtained by machining the secondary profile of FIG. 9a in the implementation of the method according to the second embodiment of the disclosure herein.
Figure 10B:
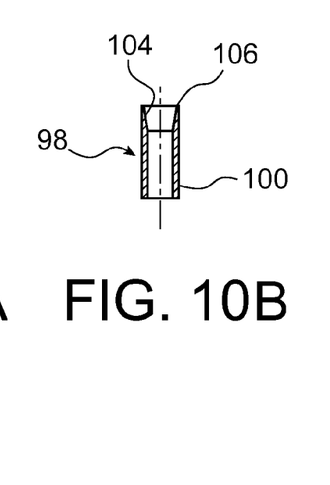
FIG. 10B is a schematic view in axial section on C-C of FIG. 10A of the reinforcing element of FIG. 10A.

The manufacture of the reinforcing elements 98 then comprises the machining of the internal surface of each secondary preform 100 so as to form in this internal surface a frustoconical portion 104 the cross section of which widens as far as one axial end 106 of the secondary preform 100 (FIG. 10B). FIGS. 10*a* and 10*b* thus show a reinforcing element 98 obtained after the machining of the corresponding secondary preform 100.

The method next comprises applying each reinforcing element 98 to a region of the preform 96 that is to be reinforced.

Figure 11A:
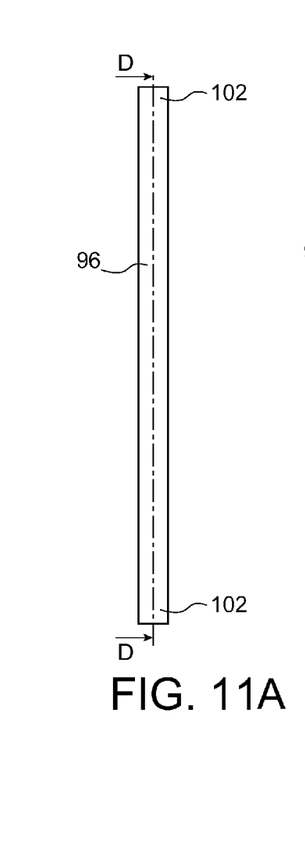
FIG. 11A is a schematic side view of an assembly formed of the preform of FIG. 8A and of the reinforcing element of FIG. 10A which is push-fitted into one end of the preform of FIG. 8A in the implementation of the method according to the second embodiment of the disclosure herein.
Figure 11B:
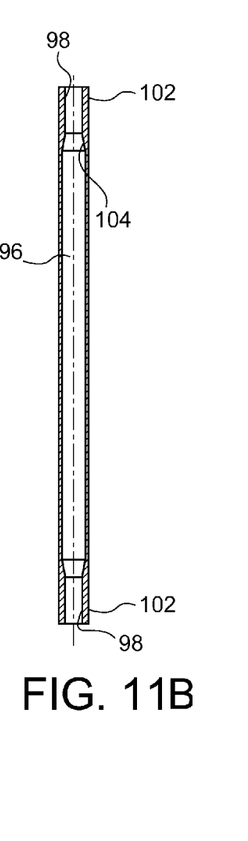
FIG. 11B is a schematic view in axial section on D-D of FIG. 11A of the assembly visible in FIG. 11A.

More specifically, this operation in this instance consists in push-fitting the two reinforcing elements 98 into a respective one of the two opposite end parts 102 of the preform 96, as illustrated in FIGS. 11A and 11B.

Optionally, the reinforcing elements 98 may be slit in their longitudinal direction beforehand in order to make them easier to push-fit into the preform 96.

Next, a pressure of around 1 bar or more is applied to the interior surface of each reinforcing element, radially towards the outside, so as to keep the surface of the reinforcing element in contact with the surface of the preform 96. The pressure is applied for example by vacuum bladders or bags. The preform is preferably engaged in a mating cylindrical form that allows counterpressure to be applied to the exterior surface of the preform 96. Preferably, the vacuum is created upon contact of all the surfaces of the preform and of each reinforcing element. In this way, the risk of delamination or of porosities occurring can be limited as far as possible.

The assembly thus obtained is then placed in an autoclave or in an oven in order to complete the polymerization of the resin of the material that forms the preform 96 and each reinforcing element 98, preferably so as to attain a degree of polymerization of the resin greater than or equal to 95%.

As an alternative, the completing of the polymerization of the resin under pressure may be performed by a hot forming press, making it possible to avoid recourse to vacuum bags and the autoclave.

In general, the bond between the preform 96 and each reinforcing element 98 is thus achieved by cocuring.

In the example illustrated, the frustoconical portion 104 of each reinforcing element 98 makes it possible to avoid there being a discontinuity in the interior surface of the link rod 95.

Figure 12A:
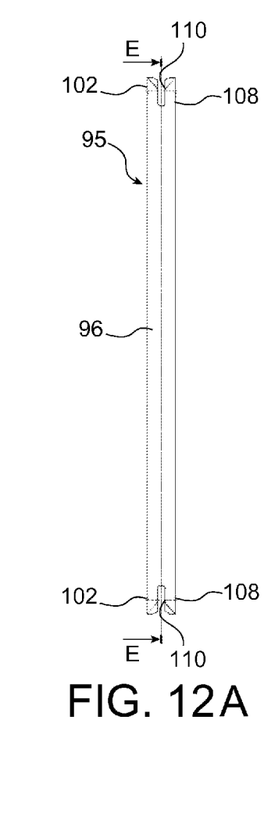
FIG. 12A is a schematic side view of a part obtained by machining the assembly of FIG. 11A at the end of implementation of the method according to the second embodiment of the disclosure herein.

The method next and optionally comprises a machining step. In the specific case of the creation of the structural link rod 95, the machining relates in particular to the ends of the part so as to form the fixing yokes 108. To do that, two longitudinal slots 110 are machined from the respective longitudinal ends of the structural link rod 95, and through-orifices are then pierced in the link rod through the end parts 102 strengthened by the reinforcing elements 98, in a direction substantially orthogonal to the plane E-E of the longitudinal slots 110.

Figure 12B:
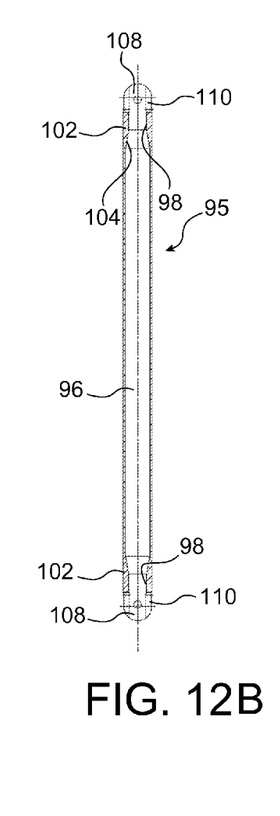
FIG. 12B is a schematic view in axial section on E-E of FIG. 12A of the part visible in FIG. 12A.

As FIG. 12B shows, the reinforcing elements 98 produce an additional thickness of the interior surface of the structural link rod 95 at the end parts 102 thereof.

FIGS. 13A to 17B illustrate the creation of a structural link rod 95*a* using an alternative form of the method according to the second embodiment described hereinabove.

In this alternative form, the secondary performs 100*a* (FIGS. 14A and 14B) have an internal cross section of a shape that substantially complements the external cross section of the preform 96 (FIGS. 13A and 13B) so as to allow the two opposite end parts 102 of the preform 96 to be push fitted later into the respective secondary preforms 100*a*.

Figure 13A:
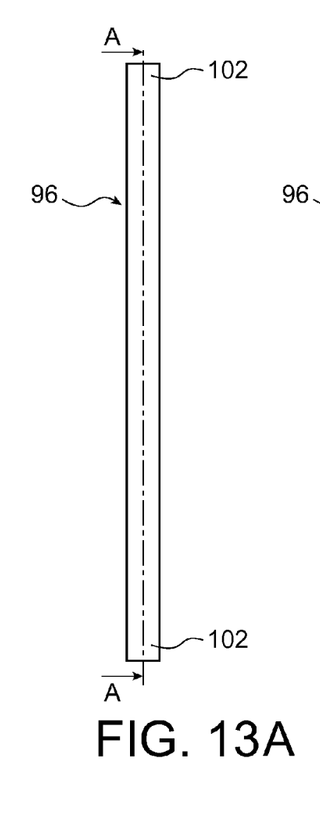
Figures 13B, 14A, 15A:
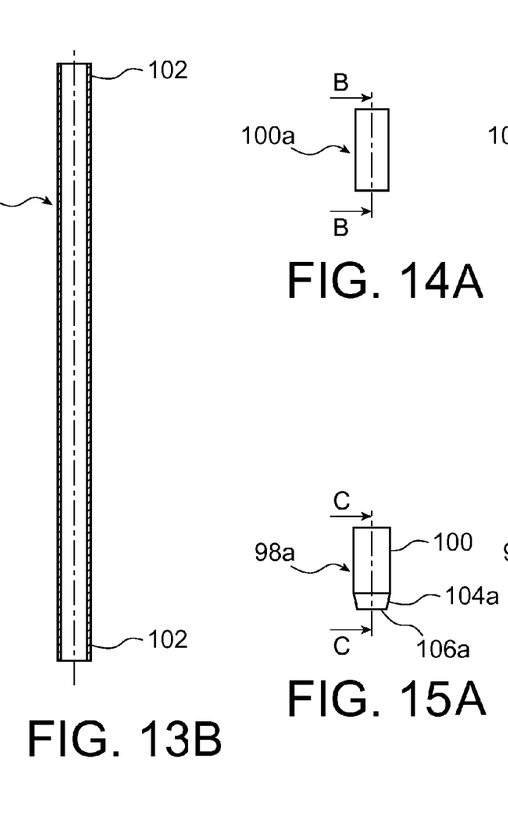
Figure 14B:
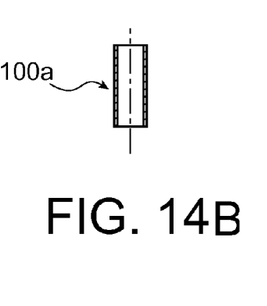
Figure 15B:
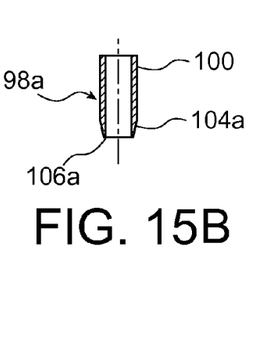

In addition, the machining of the reinforcing elements 98*a* is on the external surface of each secondary preform 100*a* so as to form in this external surface a frustoconical portion 104*a* of a cross section that widens from an axial end 106*a* of the secondary preform 100*a* (FIGS. 15A and 15B).

Figure 16A:
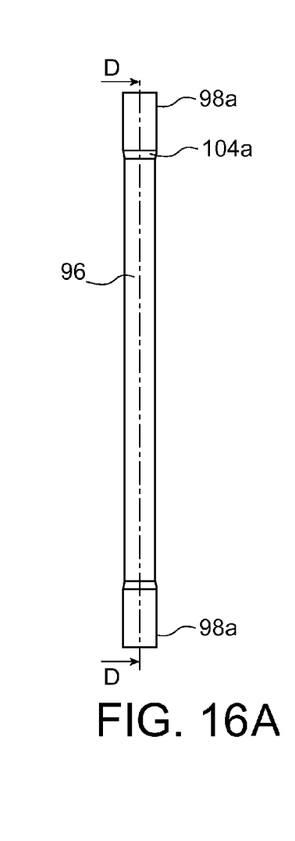
Figure 16B:
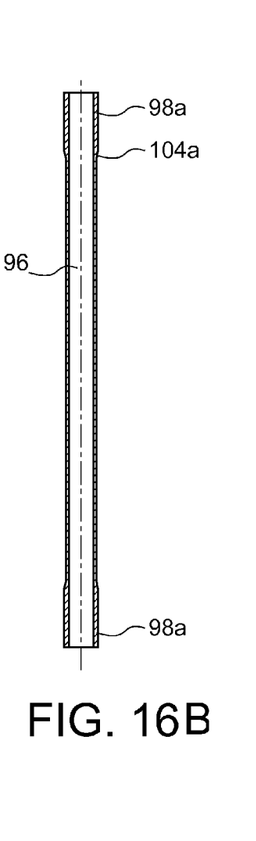
Figure 17A:
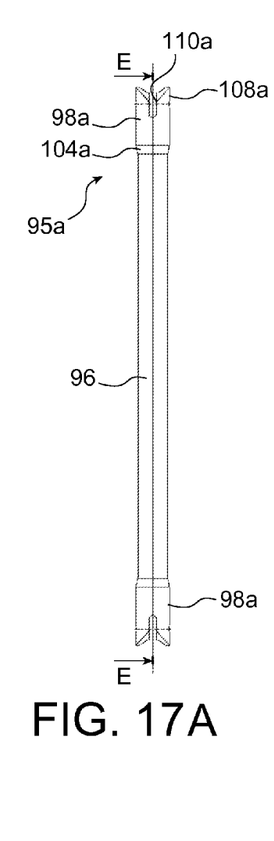
Figure 17B:
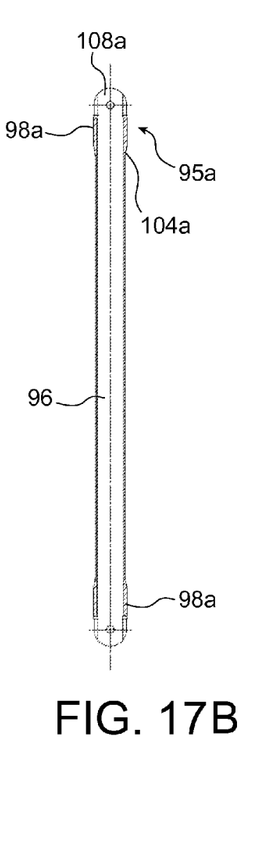

The operation of applying each reinforcing element 98*a* to a region of the preform 96 which region is to be reinforced then consists in push-fitting the two reinforcing elements 98*a* onto a respective one of the two opposite end parts 102 of the preform 96, as illustrated in FIGS. 16A and 16B. Optionally, the reinforcing elements 98*a* may be slit beforehand in their longitudinal direction in order to make push-fitting them on to the preform 96 easier.

The mating form used in this case may be a mandrel engaged inside the preform 96.

The part obtained may later be machined, for example to create slots 110*a* and form yokes 108*a* as in the case of the link rod 95 described hereinabove.

It should be noted that, in this example, the reinforcing elements 98*a* produce an additional thickness on the exterior surface of the structural link rod 95*a*.

In that case, the frustoconical portion 104*a* of each reinforcing element 98*a* makes it possible to avoid there being a discontinuity in the exterior surface of the link rod 95*a*.

In general, the method according to the disclosure herein therefore makes it possible to obtain, in a simple and inexpensive manner, a part made of composite material of elongate overall shape that has a relatively complex shape.

Moreover, it should be noted that, in the methods described hereinabove, multiaxis fabrics may be positioned and guided through the pultrusion installation so that they become superposed with the reinforcing fibers 62. As is known to those skilled in the art, such fabrics comprise fibers oriented in several directions that are inclined with respect to the longitudinal direction defined by the reinforcing fibers 62.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a part of elongate overall shape from composite material for an aircraft structure, the method comprising:
   creating a pultruded preform in a first composite material containing reinforcing fibers embedded in a polymerizable resin, so that the resin of the preform obtained is in a state of partial polymerization;
   separately creating at least one reinforcing element from a second composite material containing reinforcing fibers embedded in a polymerizable resin so that the resin of the reinforcing element obtained is in a state of partial polymerization; then
   applying the at least one reinforcing element to a region of the preform which region is to be reinforced, wherein a pressure is applied to the at least one reinforcing element to hold it in position at the region of the preform which is to be reinforced prior to completing the polymerization; then
   completing the polymerization of the resin belonging to the assembly formed of the preform and of the at least one reinforcing element such that the reinforcing element is bonded to the preform by co-curing; and
   thus obtaining a part in composite material for an aircraft structure that has at least one portion reinforced by the at least one reinforcing element.

2. The method according to claim 1, in which the part is a fuselage longitudinal stiffener or a floor crossmember or a floor rail or a floor support strut or a structural link rod.

3. The method according to claim 1, in which the preform has at least one end part intended for the fixing of the part and constituting the region that is to be reinforced to which the at least one reinforcing element is applied.

4. The method according to claim 1, comprising a later step comprising piercing at least one orifice through the reinforced portion of the part.

5. The method according to claim 4, comprising a later step comprising passing a cable or a duct or a fastener through the orifice.

6. The method according to claim 1, in which the at least one reinforcing element has a planar shape and is applied to a planar portion of the preform.

7. The method according to claim 1, in which the preform has a closed cross section, and in which the at least one reinforcing element is applied to the region of the preform which region is to be reinforced, by push-fitting.

8. The method according to claim 7, in which the preform is of tubular shape, and at least part of the at least one reinforcing element is of tubular shape able to be push-fitted together with the preform.

9. The method according to claim 8, in which the at least one reinforcing element consists of two reinforcing elements of tubular shape, and in which the reinforcing elements are respectively push-fitted into or on to two opposite end parts of the preform that form fixing interfaces.

10. The method according to claim 1, in which a degree of polymerization of the preform and of the reinforcing element prior to completing the polymerization of the assembly of these two elements is between 10% and 50%.

11. The method according to claim 1, in which the at least one reinforcing element is created using pultrusion.

* * * * *